United States Patent [19]

van Ravenzwaay et al.

[11] 3,952,393

[45] Apr. 27, 1976

[54] MACHINE AND METHOD FOR ASSEMBLING PISTONS INTO ENGINES

[75] Inventors: Jacob van Ravenzwaay, Richmond Hill; Larry Ord, Orton; Norman Nicol, Richmond Hill, all of Canada

[73] Assignee: International Standard Electric Corporation, New York, N.Y.

[22] Filed: Dec. 30, 1974

[21] Appl. No.: 522,237

[30] Foreign Application Priority Data

Jan. 17, 1974 Canada .............................. 190424

[52] U.S. Cl. .................. 29/208 R; 29/156.4 R; 29/200 R; 29/211 R
[51] Int. Cl.² .......................................... B23P 19/04
[58] Field of Search .......... 29/208 R, 208 D, 211 R, 29/211 D, 200 R, 208 C, 156.4 R, 156.5 R, 464, 466, 244, 252, 235

[56] References Cited
UNITED STATES PATENTS

| | | | |
|---|---|---|---|
| 2,036,475 | 4/1936 | Heimbach et al. | 29/244 |
| 2,578,124 | 12/1951 | Birkebak | 29/208 R X |
| 2,716,272 | 8/1955 | Wenk et al. | 29/224 |
| 3,813,755 | 6/1974 | Maskell et al. | 29/252 |

*Primary Examiner*—Victor A. DiPalma
*Attorney, Agent, or Firm*—James B. Raden; Marvin M. Chaban

[57] ABSTRACT

A production line for mechanically assembling pistons into cylinders of an internal combustion engine block and for automatically mounting the split bearing for each piston connecting rod to the crankshaft of the engine. At one end of the line, the engine block is laid on end with the piston cylinders extending horizontally. A magazine with a generally cylindrical sleeve in alignment with each cylinder bore in the engine is supplied with pistons complete with connecting rods. The connecting rods are positioned facing the top of the engine block. A split bearing end cap for each piston is placed in suitable holders on the sides of the magazine. At one station of the line, a ram automatically pushes one or two pistons into the engine block. A nesting receiver is positioned to receive the end of a connecting rod and guide the bearing end of the rod onto the crankshaft. Thereafter the bottom split bearing end cap is carried to the crankshaft for connection to the top end cap of the connecting rod. This procedure is repeated, as necessary, to fit the remaining pistons into the engine cylinders.

10 Claims, 8 Drawing Figures

MACHINE AND METHOD FOR ASSEMBLING PISTONS INTO ENGINES

BACKGROUND OF THE INVENTION

The assembly of pistons into internal combustion engines is a complex process. The piston rings must be compressed while the piston is aligned with the cylinder bore. Care must be taken not to damage either the rings, the cylinder walls or crankshaft split bearing of the connecting rod assembled to the piston. The bearing is comprised of two mating split journal sections, one of which is affixed to the end of the connecting rod. These bearing sections are carefully mated and machined together as a precautionary measure underscoring the importance of this assembly to the assembled engine. The assembly of the piston and bearing to the crankshaft must be accomplished very carefully so that the bearing surfaces are not marred and the alignment is proper.

Because of the many interrelated, critical steps which must be performed in mounting each piston in the engine, most automotive assembly lines still use assembly line manual labor for performing the many steps of the assembly.

SUMMARY OF THE INVENTION

The invention herein discloses an automatic subassembly process and machine for performing that process. On a larger scale, the process and machine are shown within the framework of a mechanized or automated assembly line for inserting all the pistons in an engine. For a complete assembly line, a plurality of the machines may be provided, one at each of certain stations with positionings of the engine block and crankshaft between machine-equipped stations to prepare the engine and crankshaft for the various sub-assembly stations. A number of alternative configurations or combinations of the basic sub-assembly steps are possible dependent on available space and particular requirements. The basic sub-assembly principles, however, may be carried over intact to any of these combinations. The basic sub-assembly machine is used with the engine block laid on its front end such that the cylinders are open in horizontal planes. In this position, with the crankshaft already mounted on the engine block, the bottom or remote end opening of each bore is partially obstructed by a throw of the crankshaft.

Before inserting any pistons, a magazine with at least two openings is positioned adjacent the engine block. Preferably the magazine has as many openings as there are cylinders on the engine block. The magazine has sleeves or trays which are approximately the same diameter as the cylinder bores with each sleeve being aligned substantially on a common centerline with a particular cylinder. Two magazine sleeves are used at one assembly station, those being provided for cylinders with oppositely disposed throws on the crankshaft. The order of cylinder bores to be loaded during one operation is dependent on the crankshaft configuration and the automobile firing order. In a V-8 engine as shown, two crankshaft throws in one cylinder alignment will be approximately 180° out of phase one with the other. By rotating the crankshaft to a position in which one of these throws is at top dead center and the other at bottom dead center, pistons may be properly assembled into these two cylinders during one operation.

A number of possible approaches may be used. The approach shown herein is to provide a magazine with as many piston bearing sleeves or trays as there are cylinders in the engine. A magazine is filled before or at the first station of the assembly process and the magazine is moved with the engine to successive stations at which pistons are assembled into the engine block.

Another possible approach would be to provide stationary magazines. Each such magazine would have sleeves and piston assemblies only for insertion at that station. While this approach may be less preferable than that shown, this approach would be possible using the general principle shown herein.

Preparatory to assembly using the present invention, a piston with connecting rod assembled to it is inserted into a magazine sleeve with the split bearing section of the rod inserted first. Each sleeve is mounted within a floating support in the magazine to permit cooperative interaction of the magazine with the engine block to compensate for manufacturing differences between sleeve dimensions and the cylinders. The sleeve is chamfered at one end to allow ready entry of the piston head into the magazine sleeve. In the preparatory position, the piston head complete with piston rings remain just inside the magazine opening within the generally cylindrical tray.

During assembly of a piston into the cylinder bores, the first section of a dual acting driven ram pushes the sleeve into a position abutting the engine block and a second section of the ram advances the piston through the tapered magazine sleeve to compress the rings more fully. The ram continues to advance the piston through the magazine and into the aligned cylinder of the engine. When the piston is advanced into the block, a translatory receiver receives and guides the split bearing into position around the crankshaft. The mounting bolts have previously been inserted into the split bearing and are in position for completion of the assembly.

Mounted on a shelf adjacent each sleeve on the side of the magazine is a matched split bearing cap for the free end of the bearing. This cap comprising one-half of the bearing has been suitably machined and matched for the top bearing half. The cap resting on the magazine shelf is grasped by a holding member and carried in translatory steps to a position adjacent the rear end of the crankshaft throw. The holding member is then advanced to place the split bearing end cap over the crankshaft and onto the bolts which extend from the top half of the split bearing. Nuts may then be automatically fed for mounting on the bolts in any suitable manner. Preferably the nuts are automatically fed to the engine block when the block has been advanced to the next assembly station.

The actions noted may be effected by suitable pneumatic or hydraulic mechanisms, the actions being controlled by a cam controller or by an electrically controlled program of any suitable known design.

It is therefore an object of the invention to provide an automatic device for assembling pistons into internal combustion engines, such as automobile or truck engines.

It is a further object of the invention to provide a new and improved method of assembling pistons into engines by the use of mechanized, automated devices.

It is a still further object of the invention to provide a multiple station conveyorized assembly line apparatus for automatically loading piston sub-assemblies into engine bores.

It is also an object of the invention to provide a loadable piston-storing magazine engageable with an engine block to transfer pistons automatically from the magazine to the engine block.

DETAILED DESCRIPTION OF THE DRAWINGS

Figure 1:
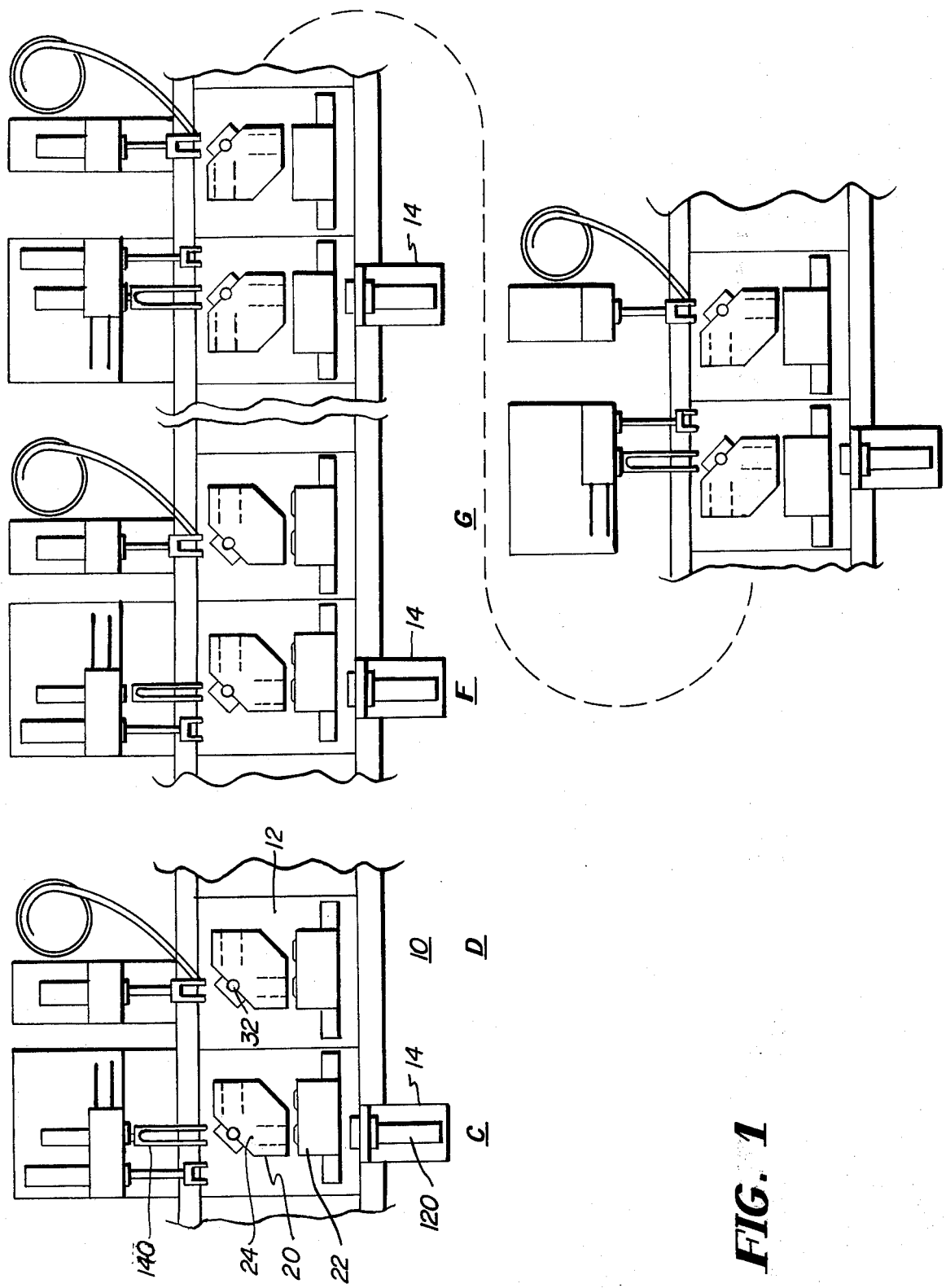
FIG. 1 is a plan view of selected portions of an assembly line using the inventive machine and process.

In FIG. 1 we show a plan view of the relevant portions of an automated assembly line 10 for V-8 engine blocks. The assembly line disclosed herein to embody our invention may have a total of nineteen stations, only eight of which have been shown in FIG. 1. The stations are constituted along a low profile, in-line pallet transfer system which is generally floor-mounted. The pallets 12 are indexed from station to station along hardened guideways using either a hydraulic or mechanical pallet transfer drive and mechanical pallet transfer mechanism. Along the sides of the line at individual stations or groupings of stations are aligned certain wing units 14, each wing unit having apparatus for performing various functions on the engine block, as will be described.

Each pallet 12 on the line is designed to bear one engine block 20 and a piston storage magazine 22 in fixed spatial relationship. Each storage magazine contains eight piston sub-assemblies within individual sleeves of the magazine, the sleeves being aligned and spaced from respective bores of the engine block. Corresponding split bearing cap segments for each piston are stored on shelves of the magazine, the magazine having been loaded off-line. A pallet 12 carrying an engine block and magazine is moved sequentially past the stations to allow the necessary assembly operations to be performed on the engine as the engine block progresses down the line in the sequency of steps. A pallet is stopped for a sequence period of time at each station, a period which may total up to fifteen seconds at each station.

Briefly stated, the operations performed at the nineteen stations may be described as being comprised of two sequences, a first sequence for inserting pistons in one engine bore alignment 24 and a second sequence for inserting pistons in the other alignment 26.

At a Station A, (not shown) the pallet bearing an engine block is suitably positioned on the end station of the line. At this station, the engine block is set on end and aligned so that the cylinders 30 of the first alignment 24 are aligned perpendicular to the line of travel of the pallet line. At the second or B station, (not shown) the crankshaft 32 of the engine is rotated to position two throws of the crank with one at top dead center and the other at bottom dead center. This rotation may be accomplished by any known means, not shown. At the third or C station, piston sub-assemblies 34 (shown in FIGS. 4, 7 and 8) are transferred from the magazine to position the bearing top half on the crankshaft 32 in the piston cylinders having crank throws at top and bottom dead center. A piston sub-assembly includes the piston 40 with rings 42 assembled into the ring grooves, and includes a connecting rod 44 complete with the top half 46 of the split bearing. Mounting bolts 48 extend from the bearing half 46.

The bottom half 50 of the split bearing or end cap of these two designated pistons are also temporarily stored in the magazine for transfer from the storage magazine at the C station. As part of the mechanism shown, the respective end caps are assembled and joined to the top halves of the respective split bearings on the crankshaft. At the 4th or D station, suitable nuts are automatically fed onto the extending bolts of the joined split bushing. The nuts are run onto the bolts and tightened to the proper torque at the D station. Any suitable known mechanism may be used for feeding nuts to the end cap and mounting bolts and tightening these nuts to a predetermined torque. The fifth or E station (not shown) is an idler station between operative areas.

At the F station (not shown), the crankshaft is rotated 90° by suitable means to position the two remaining crank throws in the first alignment at bottom and top dead center. At the seventh or G station, piston sub-assemblies are transferred from corresponding sleeves of the magazine with the bearing top half guided onto the crankshaft in the respective piston cylinders with the crank throws at the top and bottom dead center. The bottom half of the split bushing or end cap of these two designated pistons are also mounted on the crankshaft at the G station. At the eighth or H station, nuts are fed and run onto the split bushing bolts for the two pistons most recently assembled, in the same manner as described relative to the D station. The ninth or I station (not shown) is another idler station indicating the end of the first sequence.

At the tenth or J station, (not shown) the engine block is rotated 90° to place the second alignment of cylinders perpendicular to the path of travel of the pallet line to start the second sequence. The operations performed at the next six stations are identical to those described previously for stations C through H, to cause assembly of pistons in the second bore alignment of the engine. At the eighteenth or R station, (not shown) the assembly is inspected, and at the final or S station, the assembly is removed from the line by any suitable means.

From the foregoing, it can be seen that each complete assembly includes two sequences, comprised of four sub-sequences with the operations of the four sub-sequences being substantially identical, the difference being the particular pistons which are being inserted and assembled during the station operations of the specific sub-sequence. Re-stating this principle, each of the four sub-sequences includes as one step the insertion of a pair of piston assemblies and split bearing end caps followed by the second step of feeding and tightening of nuts onto the extending bearing cap mounting bolts. It is to the first of these two steps or operations within a sub-sequence that the present invention is primarily directed, that of assembling piston sub-assemblies into the engine and mounting the bearing end caps onto the assembly.

At Station C (in FIG. 1) there can be seen an engine block 20 resting upright on its front end. The engine block shown is that of a V-8 engine with its cylinder bores in two alignments, the alignments being disposed at right angles to one another as indicated by the dashed lines 24 and 26. At the intersection of the axes of the centerlines of cylinder bores 24 and 26 is the crankshaft 32 appearing as a circle in FIG. 1, FIG. 1 showing the top end of the crankshaft.

Each engine block 20 rests on a suitable slide pallet 12 with respect to which the engine block is fixed but rotatable. Rotation of the engine is used to align one or the other row of cylinder bores perpendicular to the length of the assembly station alignment. The pallets are also movable translatorily along the length of the line from station A through station O. A pallet may be locked into position at each station by suitable means (not shown) during the assembly operation at that station.

A magazine 22 (as shown in greater detail in FIG. 2) is mounted on the same pallet as a corresponding engine block for movement with the block from station to station. In the normal condition there is a fixed spacing of approximately ¾ inch between the engine block and the adjacent side of the magazine. Each magazine has two parallel columns of tubular sleeves 60, the sleeves in a column being aligned vertically with the respective cylinder openings 30 of the adjacent engine block. Thus each magazine has four sleeves 60 in a vertical column, the vertical sleeves of a column being in alignment with the cylinder bores of the adjacent engine block.

Each magazine has side shelves 62, one shelf 62 on each side substantially in horizontal alignment with each horizontal row of open bores. The shelves are designed to hold individual bearing end caps (also called the bearing bottom half) 50 in position for carriage to the bearing once a piston has been inserted in a corresponding bore within the engine.

Figure 3:
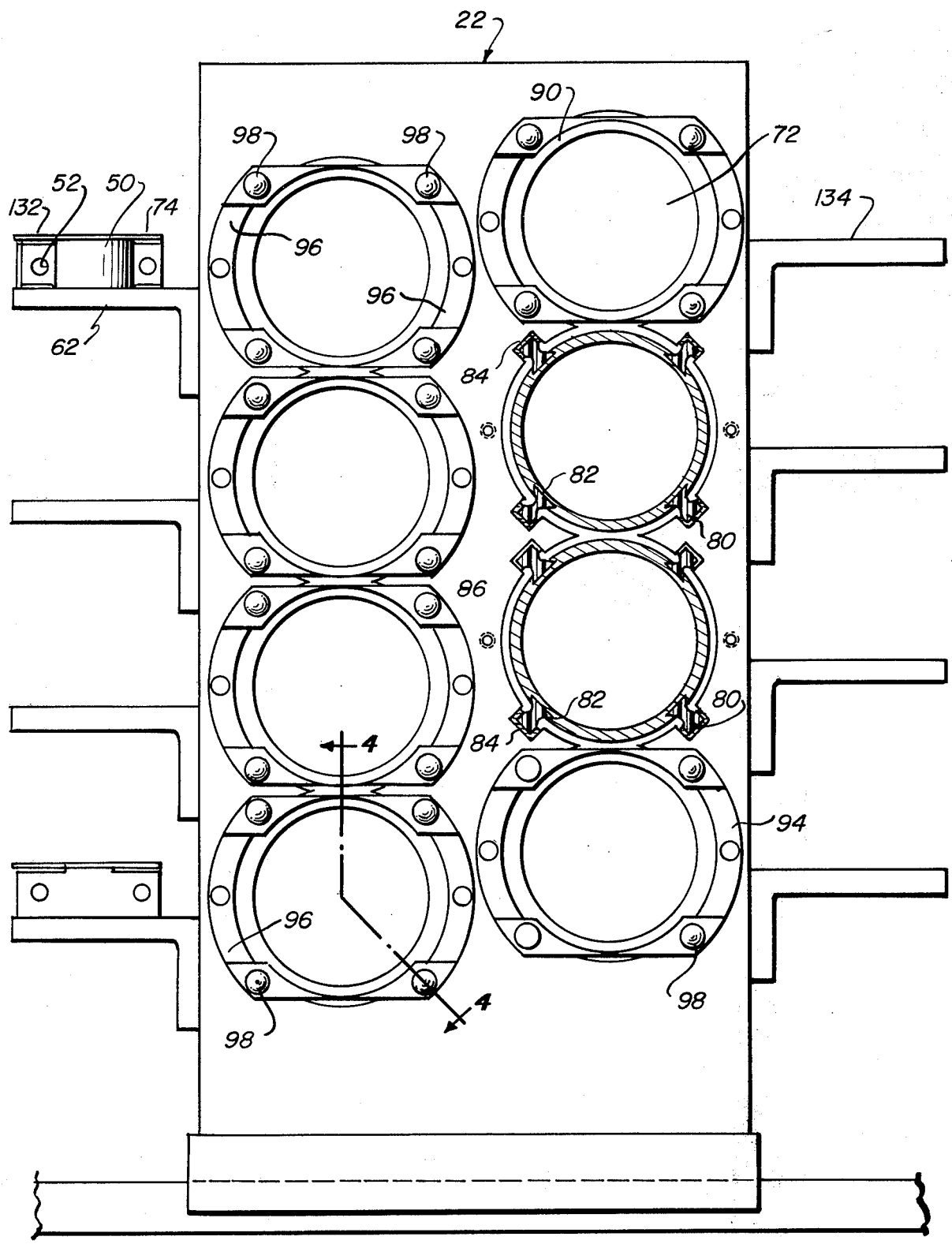
FIG. 3 is an end view of a magazine at the station of FIG. 2 viewed from the entry side thereof.
Figure 4:
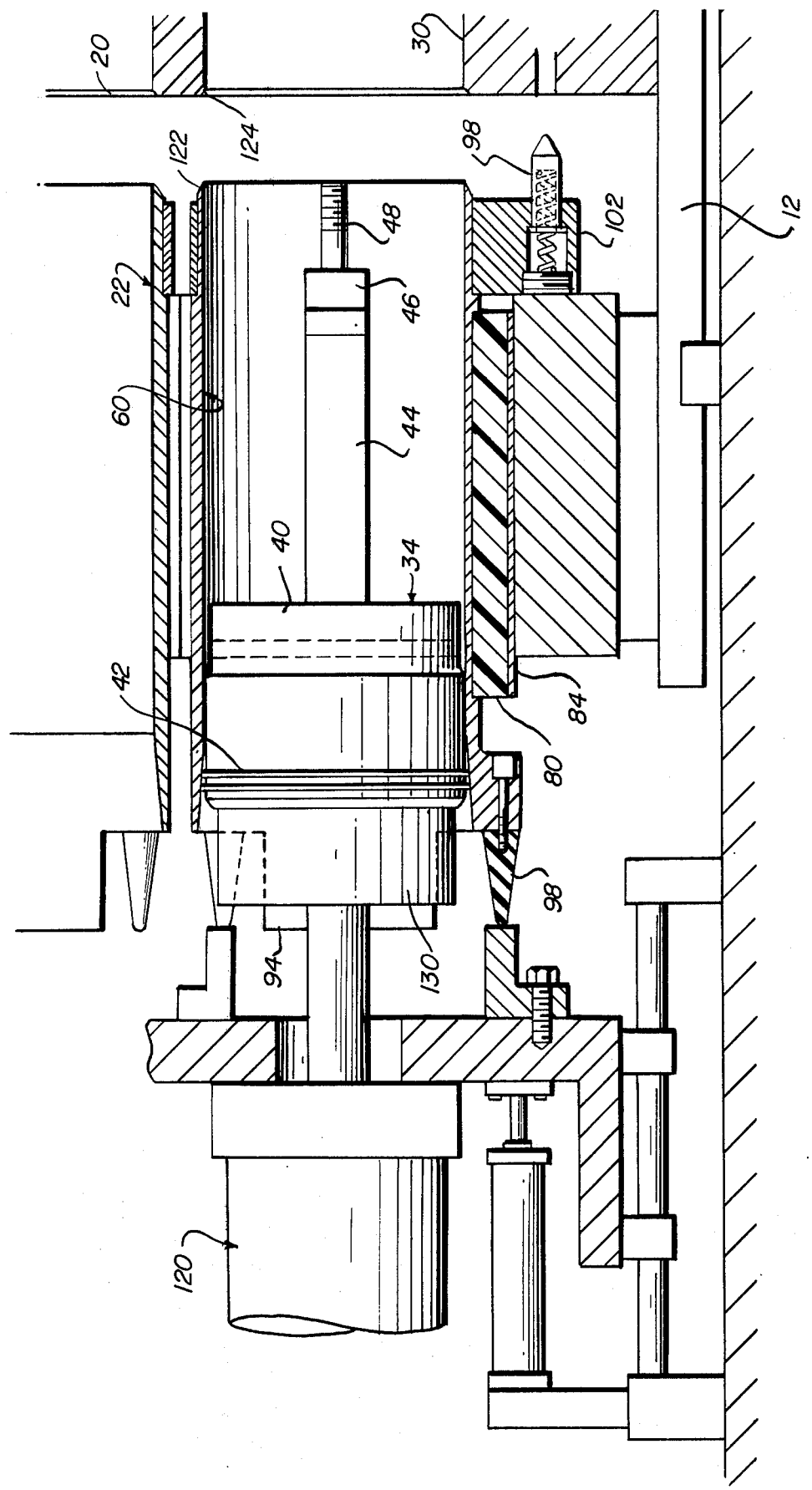
FIG. 4 is a section taken along line 4—4 of FIG. 3 with the magazine in alignment with an engine block and pusher assembly.
Figure 5:
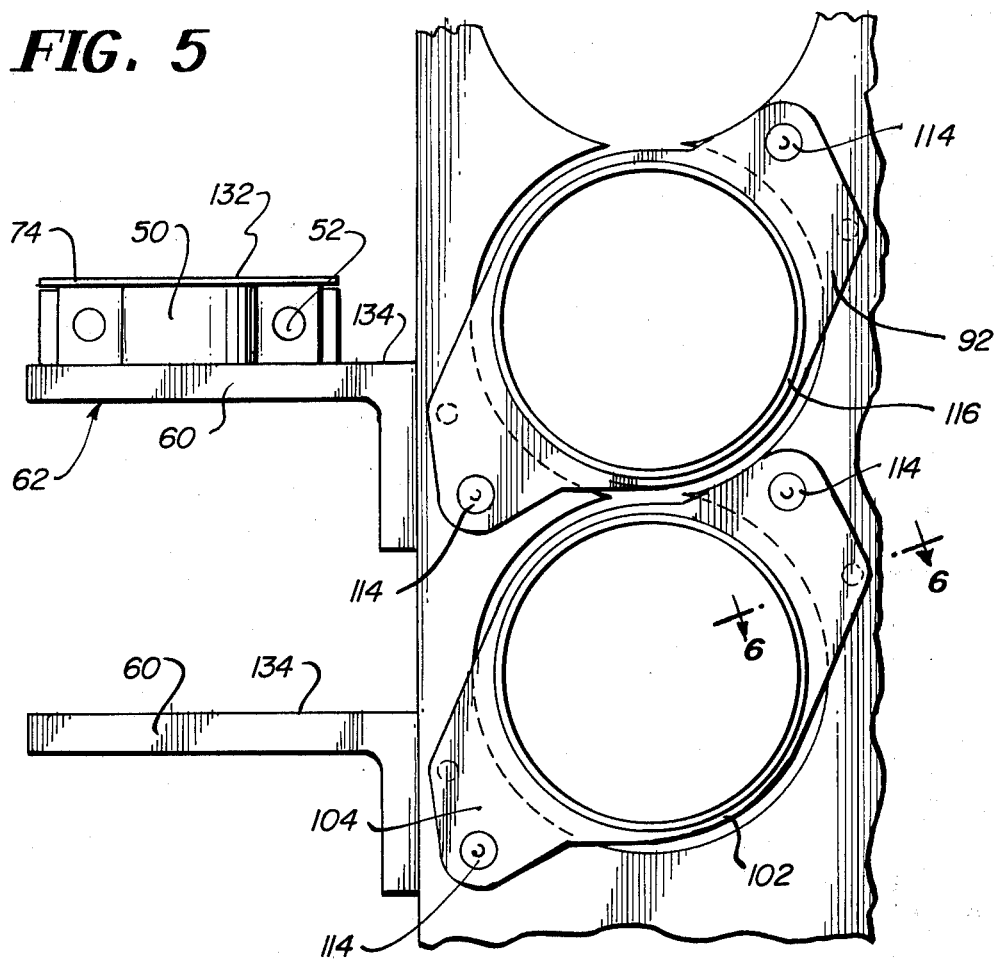
FIG. 5 is a partial view of a magazine of FIG. 3, viewed from the exit side thereof.

As can be seen best in FIGS. 3 and 4, the magazine sleeve construction may be accomplished by providing an alignment 70 of overlapping bores 72 in the otherwise solid body of the magazine. In each magazine bore is affixed a tubular sleeve, the sleeves actually forming the spaced apart piston-receiving storage members within the magazine structure.

The magazine is loaded with piston sub-assemblies, preferably off-line, with a piston sub-assembly 34 inserted into each magazine sleeve. The piston sub-assembly at this point in the process includes the necessary piston rings 42, in suitable piston grooves on the sidewall of a piston 40, as is well-known. A connecting rod 44 has also been suitably assembled onto the piston, the connecting rod having affixed at its outer end the top half 46 of the crankshaft split bearing. Bolts 48 have also been assembled firmly into suitable mounting holes in the ends of the top half of the split bearings in known manner. These bolts extend toward the engine block once the piston sub-assembly is in a magazine. Assembled to the extent described, pistons are inserted into the sleeves of the magazine prior to the assembly process to be described in detail herein.

Also either off-line or at the first station, the bottom halves 50 of the bearing split rings are placed on the shelves 62, one-half ring on each shelf 62. The bearing halves are suitably noted beforehand such that a particular bottom bearing half is to be assembled to a particular top bearing half, as is well-known in the art. The ring halves are positioned within individual resilient holders 74 with the concave face 76 of the bearing cap facing the engine block.

In FIGS. 3 and 4, we show the physical construction of magazine 22 including the plurality of sleeves 60. The sleeves are identical so that description of any one sleeve is all that need be provided. Each such sleeve is a generally tubular member preferably of stainless steel or the like which is mounted slideably in an axial sense relative to the magazine amount to a limited degree. Each sleeve also may be considered as floating within the magazine, as will be explained next. To provide this limited sliding and floating movement, the sleeve has secured onto its periphery four angularly spaced, axially extending keys or strips 80. These keys, which may be of rigid urethane or other similar flexible, shock-resistant elastomeric slide material, are fastened by either press-fitting, molding or bonding within suitably configured key grooves 82, the grooves being inset into the peripheral wall of the sleeve. The key strips ride within axially extending key ways 84 notched within the magazine bore walls. The key strips are necked as indicated by the reference numeral 86 to allow a limited amount of self-alignment of the sleeve relative to the magazine block during movement of the sleeve.

At both its entry and exit ends, each sleeve is held relative to the magazine by means of enlarged heading members 90 and 92. These members are larger than the magazine structure bore so that the sleeve once assembled remains affixed to and part of the magazine. Heading member 90, the member at the entry of the magazine, is generally cylindrical with flats 94 at the top and bottom. These flats generally provide relief from interference between adjacent heading members 90 and are configured to reduce the possibility of jagged edges. The rear face of the heading member provides opposed, rearwardly projecting, tapered guide sections at the sides 96 and four spaced-apart, tapered guide pins 98. The guide sections and pins provide a tapering entrance to the sleeve. The inside diameter of the sleeve at the entry end is sufficiently large to receive the piston rings slightly compressed during the movement of the rings past the pins and guides as the piston is inserted into the magazine. The taper of the sleeve walls continues for a further distance sufficient to fully compress the piston rings during piston advance. The main cylindrical bore of the sleeve is dimensioned to pass the piston therethrough with the rings in a compressed condition.

Figure 6:
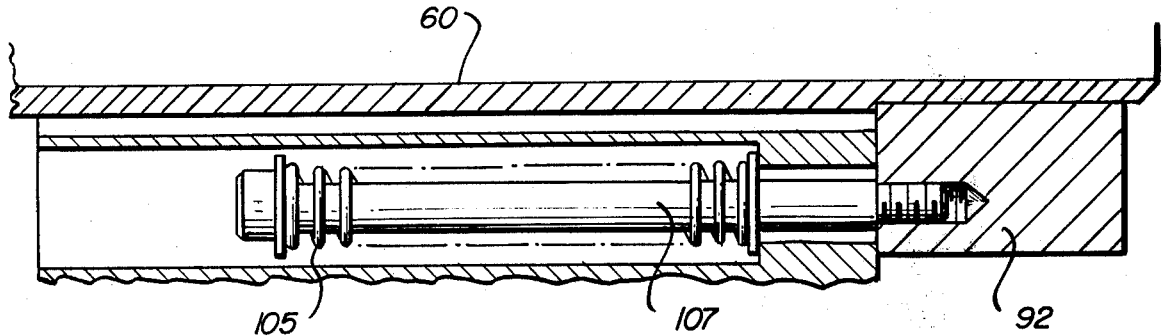
FIG. 6 is a section taken at line 6—6 of FIG. 5.

Near its front or exit face, the sleeve has a shoulder 110 in its peripheral outer wall against which is butted the rear end of front heading member 92. This heading member is preferably slip-fitted on the sleeve and is suitably affixed to the sleeve. The front heading member has a sleeve encircling section 102 and two diagonal opposed enlargements 104. Extending forwardly from the front end of the opposed diagonal enlargements of the front heading member are two tapered guiding pins 114. These guide pins are spring-loaded to a forward position which extends beyond the front edge 116 of sleeve 60. The tapered guide pins 114 at the exit end are positioned to mate with and enter threaded openings in the face of the engine cylinder block, these holes being provided for mounting of the engine head to the engine block. Compression springs within the mounting of pins 114 allow the pins to retract when exposed to a compressive endwise force. The sleeve itself is biased rearwardly by means of one or more compression springs 105 (as shown in FIG. 6), the springs holding the entry heading member 90 of the sleeve against the adjacent magazine face with the exit header member 92 normally spaced from the adjacent magazine face. The spring may be mounted on a suitable support rod 107 threaded into the exit header 92. The compression spring acts on an exit end sleeve section 109 to maintain the sleeve biased toward the entry end.

A piston is inserted into the magazine sleeve with the connecting rod bearing end inserted first and the piston face is at the rearmost end of the sleeve bore. The piston head is guided by tapered guide pins 98 and tapered guide sections 96 to center the piston. As it enters the sleeve, movement is continued until the piston rings rest against the adjacent tapered sidewall of the sleeve as compressed by the tapered rear pins and guide section. The tapered guide pins 98 and guide section 96 operate to permit easy, self-centering entry in guiding of a piston into the magazine sleeve and partial compression of the piston rings. This partial compression tends to hold the pistons in the respective magazine bores during the preliminary steps of the assembly process.

At the wing units (stations C, G, K and O) are provided similar mechanisms for transferring piston assemblies from the magazine to the engine block, two at a station. At each such wing unit for each piston to be inserted at that station, a two-step ram 120 engages the entry header of one sleeve and starts moving the header and sleeve in a forward direction. The tapered guide pins 114 at the exit end of the sleeve engage the engine block openings to align the sleeve bore relative to the block bore and thereby place the front face of the sleeve closely adjacent the face of the engine block. The tapered outer peripheral edge 122 of the sleeve 60 enters into a slight overlapping engagement with a slight chamfer 124 on the adjacent engine block bore. The slideable sleeve mounting by means of key strips 80 and the spring/loading of the guide pins 114 accommodate a limited amount of variation between the magazine sleeves and engine cylinder bores in an amount which may reach 0.020 inch. The mating of pins 114 with the engine bolt openings provide a self-centering feature during the movement of the sleeve into engagement with the cylinder bore. By the entry of the edge 122 of sleeve 60 into the chamfer 124 of the mouth of the engine bore, a close-abutting arrangement of the sleeve into engine block leaves no appreciable gap which would allow the piston rings to expand and hang up or catch as they pass from the sleeve into the engine block.

When the sleeve reaches its full forward position, the second step of the ram 120 moves only its central section 130 to push the piston forward, the piston continuing its travel forward through the sleeve and thereafter into the engine block. The total stroke of the ram 120 to effect this piston movement is a distance which may be either 14 inches or 17½ inches. The two stroke distances are dependent on the crank throw position as either top dead center (14 inches stroke) or bottom dead center (17½ stroke). The apparatus acting on the piston to effectuate this piston insertion or transfer will be described further.

As mentioned previously, mounted adjacent each magazine bore is a small shelf 62. These shelves individually support the bottom half sections 50 of a split bearing within a spring-loaded mounting 74, the spring force being directed downwardly to position the bearing with its convex face open. The spring-loaded mounting comprises a flat plate 132 parallel to the shelf surface 134, the plate 132 being designed to rest on the flat side surface of the split bearing half.

Figure 2:
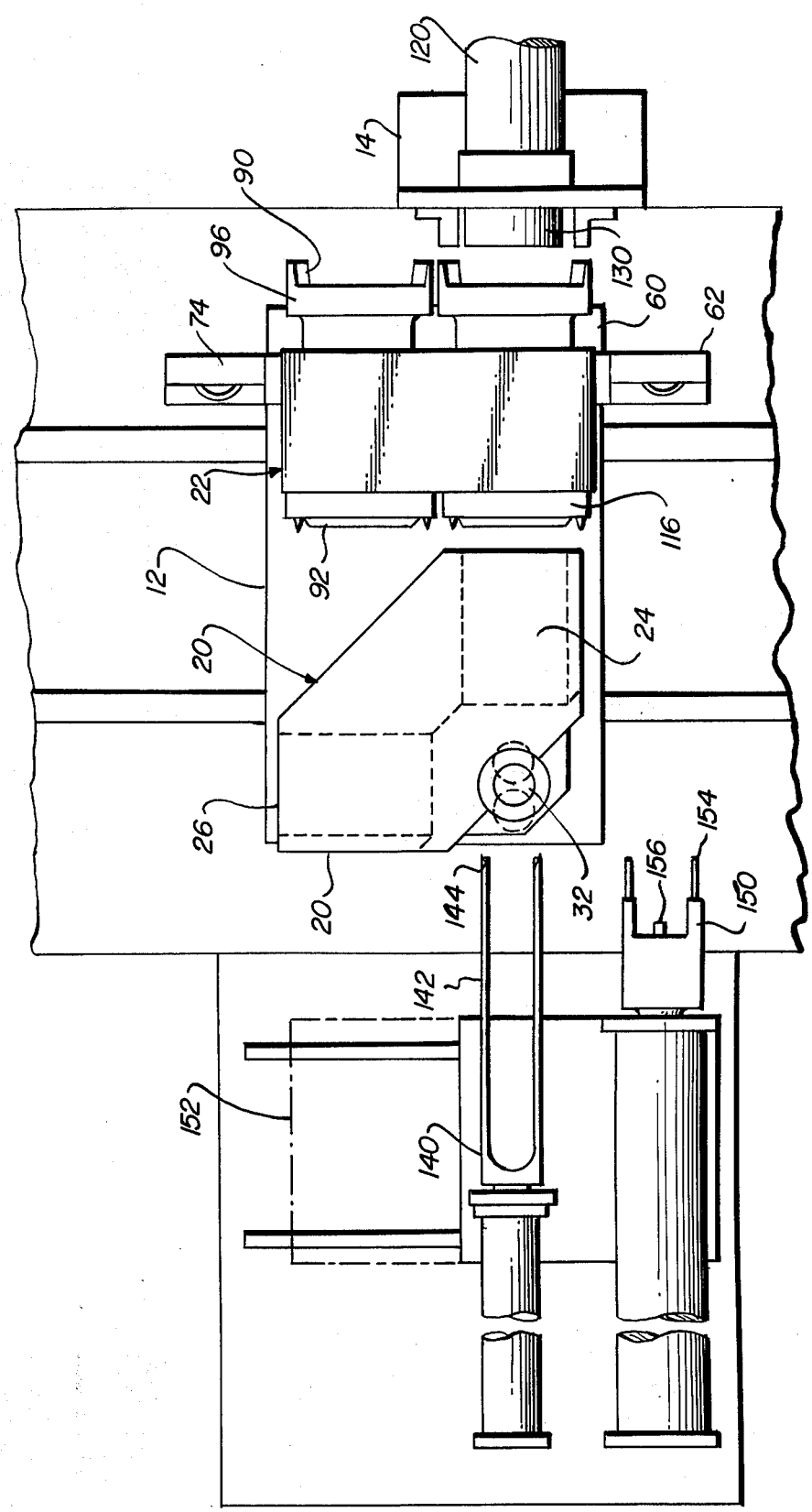
FIG. 2 is a plan view of a specific station of the line of FIG. 1.
Figure 7:
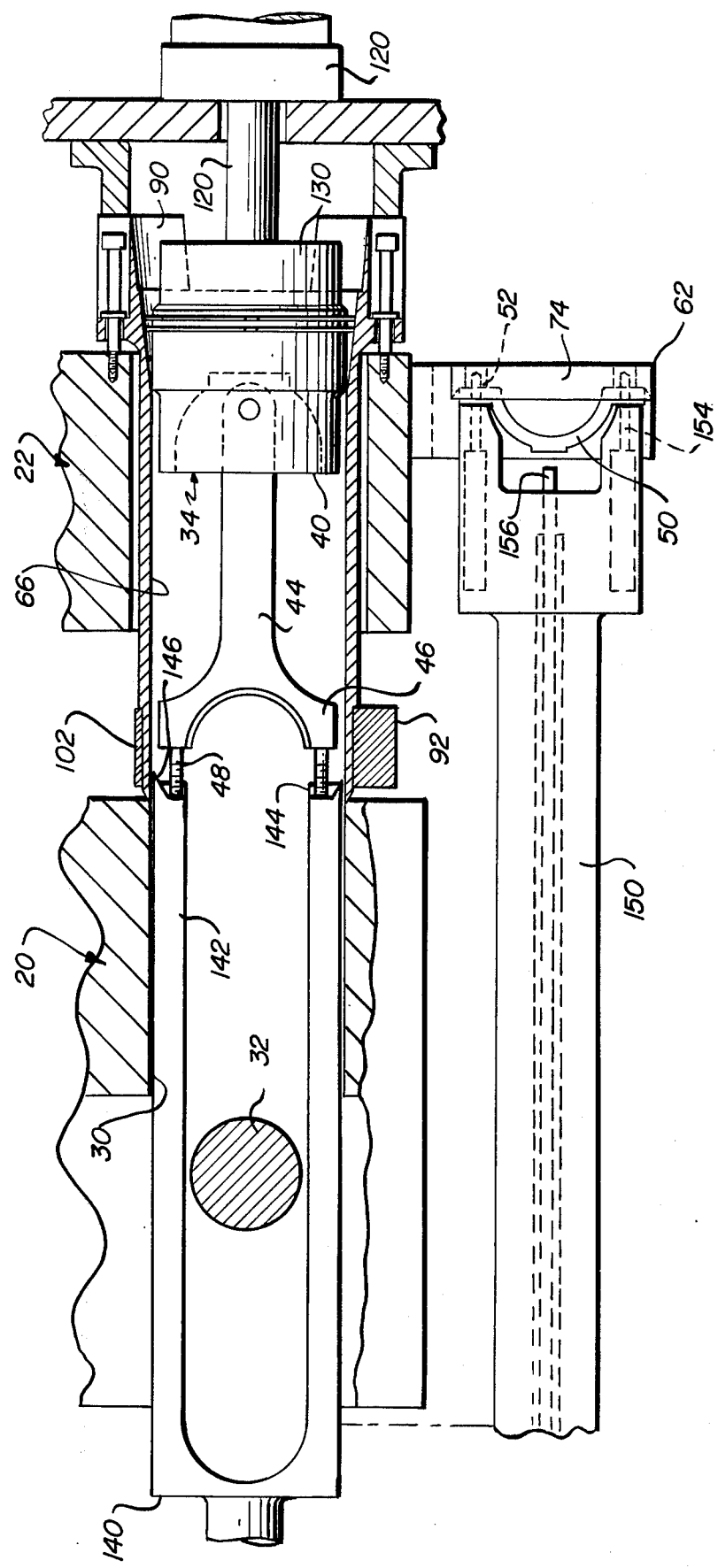
FIG. 7 is a plan view of the device in section at the start of the mechanized piston inserting process.
Figure 8:
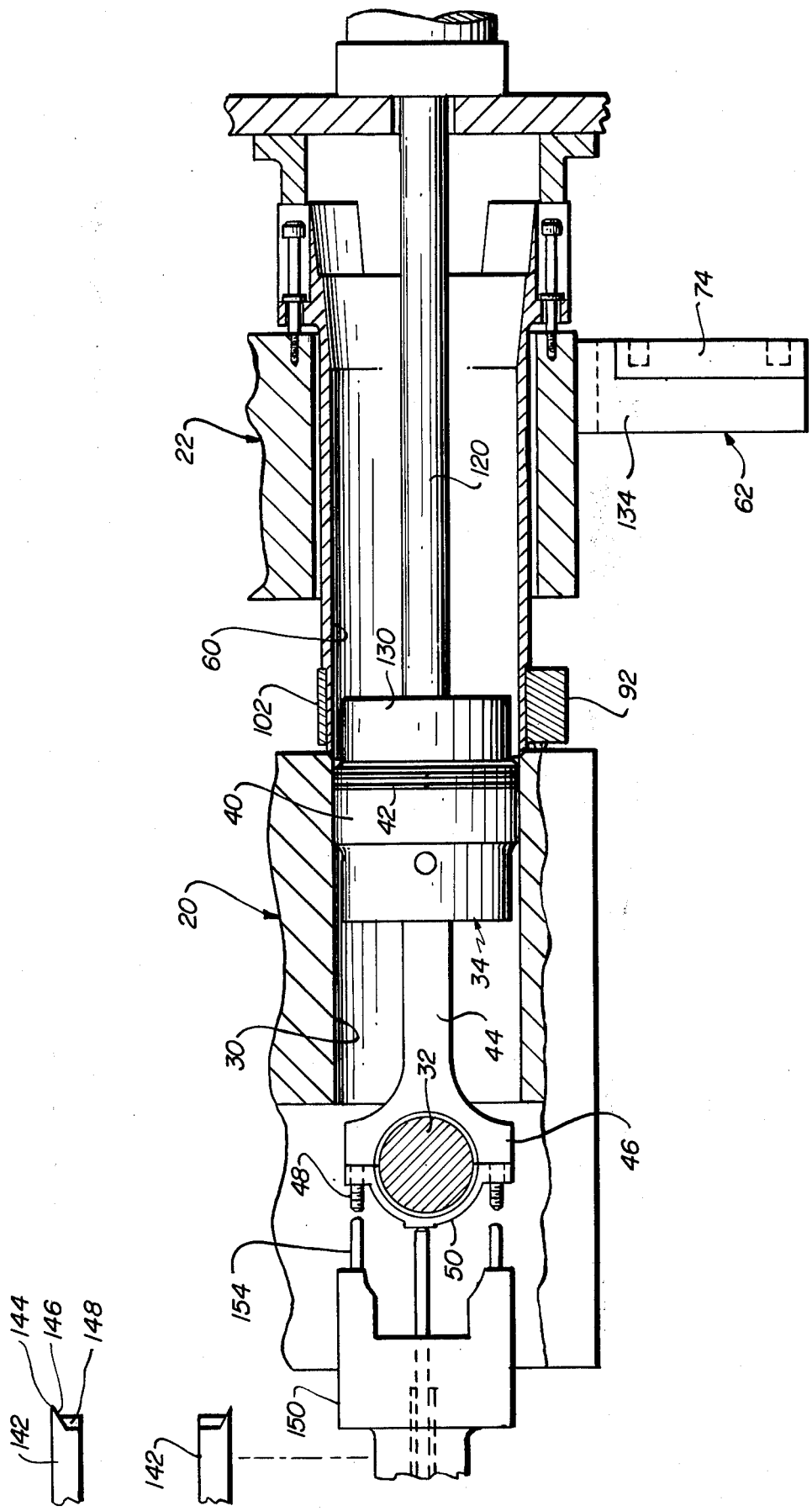
FIG. 8 is a plan view of the device of FIG. 7 with a piston assembly fully advanced into the engine block.

The apparatus at a piston insertion station such as station C of FIG. 1 is shown in greater detail in FIGS. 2, 7 and 8. Shown in FIG. 2 is one set of mechanisms, those necessary for the insertion of one piston in the engine block. A second set of generally identical mechanisms is provided at the same station for inserting the second piston, one being for the crankshaft throw then at top dead center and the other for the throw at the bottom dead center.

In FIG. 2, there can be seen an engine block 20 with its adjacent magazine 22, and a ram 120. At the crankshaft end of the engine block, there is positioned in alignment with the crankshaft, a clevis member 140 with two spaced-apart, elongated extensions 142, the spacing between extensions being sufficiently great to pass the crankshaft throws. The clevis member may be advanced by suitable motive means (hydraulic, pneumatic or mechanical) to allow the extension nesting tips 144 to enter a piston bore of the engine block. The tips 144 are configured to receive and nest the bearing bolts 48 individually and guide the bearing about the crankshaft as the piston is inserted in the suitable engine block cylinder during retraction of the clevis member. The nesting tips comprise tapered outer walls 146 to align and seat the bolts in a horizontal direction and a base wall 148 to provide a floor for the bolts. In the normal position, the clevis member 140 is positioned as shown in FIG. 2 behind the crankshaft and out of the engine block.

The clevis member 140 and a forked bearing carrier 150 are mounted adjacent one another in a common horizontal plane on a tracked structure 152, the structure 152 being movable parallel to the path of pallet line travel. The carrier is reciprocable in the horizontal plane individually as moved by the suitable motive means. The forked carrier includes two spaced dowel rods 154 which enter the mounting holes in the bottom bearing cap 50 as the cap rests on a shelf 62.

To perform its function, carrier 150 advances to allow the rods 154 on the fork tines to enter the mounting holes 52 and carry the lower bearing cap 50 away from the shelf 62 in a straight line path as the carrier is retracted. When the carrier is fully retracted, the structure 152 moves transversely to position the carrier directly behind the crankshaft. The carrier then advances to align the dowel rods 154 with mounting bolts extending from the top bearing half. The rods 154 may be spring-loaded to restore on meeting the mounting bolts so that continued advance of the carrier engages the bottom bearing half onto the bolts 48. A central driver rod 156 in the carrier yoke may be advanced to centrally push the bottom bearing cap onto the bolts more fully and release the rods 154 from the mounting holes 52.

To provide the movement control in a fully automatic fashion, both at this station and throughout the assembly line shown, suitable limit switches and sequencing controls of any known suitable type may be used.

In FIGS. 7 and 8, we show a piston in an early stage of its travel from the magazine to the engine block. In FIG. 7, the second step of the two-step ram movement has moved the sleeve to the left placing the sleeve in registration with the cylinder bore of the engine block. The clevis member is shown advanced through the engine block to nest the mounting bolts within the self-centering nest 160.

The forked carrier in FIG. 7 is shown advanced to allow the dowel rods to enter the mounting holes in the bearing end cap. The clevis member and forked carrier may be advanced and retracted at the same time to speed up the operations. Thus, the clevis member and yoke carrier may be advanced at the start of the cycle at the particular station with the clevis member advancing to a position awaiting the piston advance. The carrier at the same time engages the bearing cap on the shelf adjacent the piston being inserted.

Both clevis member and carrier are retracted during and in accordance with the ram movement to position the piston in the cylinder with its top bearing half on the crankshaft. The clevis member and forked carrier are then fully retracted, and the transverse movement of the structure is initiated to position the bottom bearing cap in line with the crankshaft. The forked carrier is then advanced to position the bottom bearing cap on the crankshaft and the central rod is advanced to release the engagement of the carrier and bearing cap. This latter position is the position shown by FIG. 8.

The forked carrier will then retract fully and the structure will restore to its normal position. As mentioned previously, each mechanism at a station such as Station C will include two essentially identical operative structures one for each piston to be inserted at that station. Thus, two vertically spaced mechanisms including ram, clevis member and forked carrier are provided at each piston insertion station. These mechanisms include one for the piston for the crankshaft throw at bottom dead center at a first horizontal level and the second for the piston for the crankshaft at top dead center at a second horizontal level.

When both pistons have been inserted at a station such as Station C, the pallet drive is activated to advance the block and magazine to the D station for the feeding of nuts to the mounting bolts and tightening of the bolts. Many commercial devices are available for performing these nut feed and tightening operations, the travel path being the only member which must be custom designed.

Suitable sequence controls may be used throughout. For example, a photoelectric cell may be used to sense the presence or absence of a bearing end cap on the shelf. If a cap has not been assembled onto a shelf, the piston mating with the cap is returned to the magazine and a trouble indicator activated. A like signal may be activated if desired torque of the nuts on the mounting bolts cannot be reached. Absence of pistons may also be sensed and indicated for each operation of the apparatus.

A control system of the type sold under the trademark "Maitrol" by Cutler-Hammer may be adapted to provide the sequencing controls and sensing arrangements used. Within such a system, suitable sensors may be employed to provide limit stops and movement sequencing in the manner described.

We claim:

1. A multiple station automatic assembly apparatus for inserting piston sub-assemblies into the bores of a piston engine block in which each piston sub-assembly includes a piston member with piston rings and a connecting rod with the remote end of said rod having one portion of a split bearing affixed thereat and in which the engine block has its crankshaft assembled thereon, the apparatus comprising a platform for holding an engine block on end with the engine crankshaft extending along one side of the engine block with the engine cylinder bores positioned in an alignment, a magazine block resting on said platform a predetermined distance from said engine block, a plurality of openings in said magazine block, a tubular member in each opening adapted to hold a piston sub-assembly axially alignable with a cylinder bore, means at certain of said stations for advancing selected pistons from respective tubular members into bores of said cylinder block, and means at said certain stations movable into the cylinder bores for receiving the bearing portion of a piston sub-assembly being advanced to carry the bearing portion of the piston sub-assembly onto the crankshaft.

2. An apparatus for assembling piston sub-assembly into the cylinder bore of a piston engine block in which the piston sub-assembly includes piston rings assembled thereon and a connecting rod, comprising a stationary holding member including a tubular passage confronting said cylinder bore and axially spaced therefrom, said passage including sleeve member having a tapering entry section for compressing piston rings as a piston sub-assembly is advanced toward a main section of said sleeve member closely adjacent the cylinder bore, means for advancing said sleeve member axially into abutting relation with said cylinder bore, said advancing means further operative to advance said sub-assembly from said sleeve member into said cylinder bore.

3. An apparatus as claimed in claim 2 further including a receiver member advanceable into the cylinder bore from the end opposite the end into which the sub-assembly enters, said receiver member receptive of said connecting rod and movable to carry the connecting rod through the cylinder bore, and means for carrying a connecting rod affixing member to the connecting rod for engagement therewith.

4. An apparatus as claimed in claim 3, wherein said holding member comprises a magazine, and said passage includes a tray for holding the piston head externally of said tapering body section prior to advance of said sub-assembly.

5. An apparatus as claimed in claim 2 wherein said engine block has a plurality of parallel cylinder bores, is adapted to hold a crankshaft opposite the entry end of the cylinder bores, and is adapted to receive a plurality of piston sub-assemblies one for each cylinder bore with each connecting rod at the free end thereof including a portion of a bushing adapted to be affixed about said crankshaft, and wherein said holding means comprises a plurality of tubular passages each adapted to receive a sleeve member sub-assembly, means biasing each said sleeve member to a position spaced from the engine bore and responsive to individual advancing means to counter said biasing means and position a tubular passage in abutment with said engine block.

6. An apparatus as claimed in claim 4 wherein said carrying means comprises means for gripping a remaining portion of a bushing and for depositing said remaining portion on the crankshaft throw opposite the one portion.

7. An automatically operable machine for assembling a plurality of piston assemblies into respective bores of an engine block, in which each piston assembly has assembled thereon a plurality of piston rings; said machine including a magazine settable into an assembly position adjacent one face of said block; a plurality of cylindrical sleeves in said magazine each generally in axial alignment with a respective bore of said block when said magazine is in said assembly position, said sleeves each defining a cavity for receiving and maintaining therein a piston assembly for insertion into said engine block; and a two-part reciprocable ram member axially aligned relative to one engine bore and including an outer annular portion for axially advancing into the magazine bore aligned therewith for driving the respective sleeve relative to said magazine into communication with the engine bore axially aligned therewith and an inner ram for pushing the head of the piston within said sleeve to slidably advance said piston from its driven sleeve into the cylinder bore generally aligned with said sleeve.

8. A machine as claimed in claim 7 further including plural slide guide members interposed between each sleeve and adjacent walls of said magazine, said guide members defining floating reciprocable travel paths for the sleeves within the magazine whereby to enable precise alignment of a sleeve relative to the engine bore generallay aligned therewith.

9. A machine as claimed in claim 7, wherein each said piston assembly includes a connecting rod assembled thereto and including a first partial ring portion for registry on a throw of a crankshaft which has previously been assembled on said engine block when the respective piston assembly is in a fully advanced position in its respective bore, and means for carrying a complementary ring portion onto the opposed side of the crankshaft throw for mating with said first partial ring portion.

10. A machine as claimed in claim 9, wherein there is a second ram member similar to said first ram member, with one of said ram members adjacent an engine bore having its crankshaft throw in one extreme position and the other of said ram members adjacent an engine bore having its crankshaft throw in the opposed extreme position, for assembling the pistons adjacent the two bores during one stationary setting of the crankshaft.

* * * * *